Patented Nov. 20, 1928.

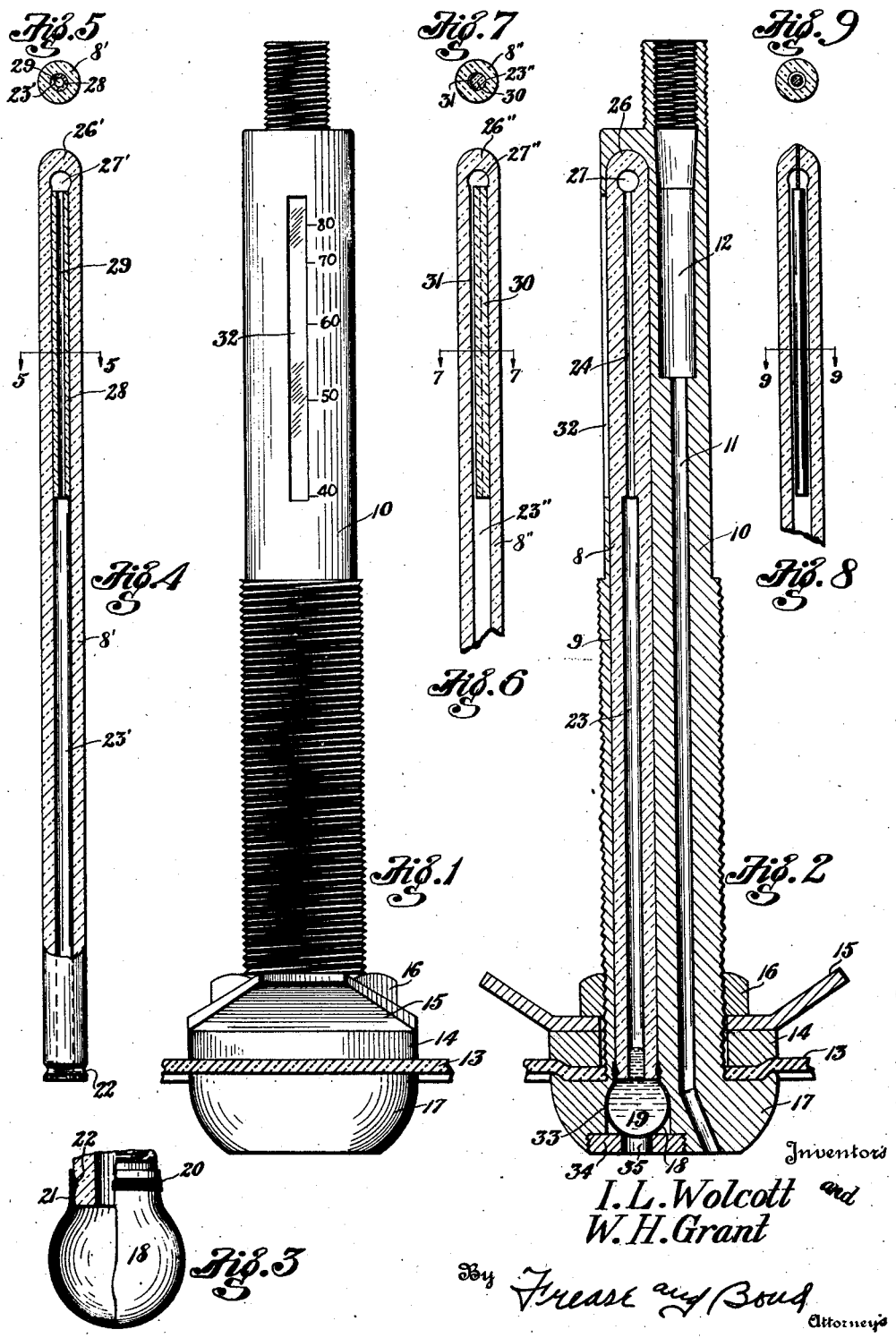

1,692,360

UNITED STATES PATENT OFFICE.

IRVING L. WOLCOTT AND WILLIS H. GRANT, OF CLEVELAND, OHIO; SAID GRANT ASSIGNOR TO SAID WOLCOTT.

PRESSURE GAUGE.

Application filed May 7, 1923. Serial No. 637,140.

The invention relates to an air gauge which may be combined with the stem which carries an air valve on the inner tube of an automobile tire, for measuring the pressure of the air therein; and the object of the improvement is to provide a glass tube, closed at one end and having a mercury column in the other end; with means for retaining the mercury and for driving it into the tube, and with means for enabling the pertinent pressures to be properly calibrated.

The object of the invention is attained by securing a collapsible bulb upon the open end of the tube, as a container for the mercury; by reducing or restricting the cross area of the bore of the tube adjacent to the closed end thereof, to permit a convenient calibration of the movements of the mercury column; and by forming an enlarged chamber in the closed end of the tube beyond the restricted portion of its bore, to receive a portion of the air compressed by the column.

The air gauge may be combined with an air valve stem, as shown in the accompanying drawings forming part hereof, in which—

Figure 1 is a side elevation of an air valve stem;

Fig. 2, a longitudinal section thereof, showing the improved air gauge located therein;

Fig. 3, a fragmentary side view, partly in section, showing the method of attaching the collapsible bulb to the open end of the gauge tube;

Fig. 4, a longitudinal section of a modified form of gauge tube;

Fig. 5, a section of the same on line 5—5, Fig. 4;

Fig. 6, a longitudinal section of another modified form of gauge tube;

Fig. 7, a cross section of the same on line 7—7, Fig. 6;

Fig. 8, a longitudinal section of another modified form of gauge tube; and

Fig. 9, a cross section of the same on line 9—9, Fig. 8.

Similar numerals of reference indicate corresponding parts throughout the drawing.

The gauge tube 8, 8' and 8" may be made of glass or other transparent material and as shown may be located in a longitudinal bore 9 provided in one side of a stem 10, in the other side of which may be provided a channel 11 and a recess 12 for an air valve; and the stem may be secured to the wall 13 of the inner tube of an automobile tire by means of a washer 14, a shield 15 and a nut 16, clamping the same against the head 17 of the stem.

A collapsible bulb 18 is secured to the open end of the gauge tube, and may be made of rubberized chamois skin or like material, which will form a container for mercury or other like liquid 19, and which will be impervious to the same and to the air; and the bulb may be secured to the tube by means of wrapped wire 20 clamping the neck 21 of the bulb into an annular groove 22 formed on the end of the tube, as shown in Fig. 3.

The bore 23 of the gauge tube, as shown, is substantially uniform in diameter except that it is materially restricted in cross area throughout a portion of its extent 24, adjacent to the closed end 26 thereof, so that the movement of the end of the liquid column will be accelerated along this portion of the bore for permitting a convenient calibration of the same, while the larger portion will carry a considerable volume of air for compression before the liquid column will extend to the reduced portion of the bore; and a comparatively large air chamber 27 is provided in the closed end of the tube for receiving air compressed by the movement of the liquid column, as shown in Fig. 2.

In view of the difficulty of making a reduced bore 24 in the body of a glass tube, the tube may be originally made with a uniform bore 23' throughout its length, in which may be inserted a smaller glass tube 28 fitting the larger bore and having a reduced bore 29 therein of the desired cross area, as shown in Figs. 4 and 5. The smaller tube may be secured in the larger tube by fusing or cementing it therein.

It is preferred, however, to make the gauge tube with a uniform bore 23", and to reduce the cross-sectional area of the opening by inserting a glass bar 30 therein, and fusing or cementing the bar to one side of the bore so as to leave an arcuate channel 31 along one side of the bar, being preferably on the side of the tube which is exposed to view, as shown in Figs. 6 and 7. This construction shows the mercury column substantially the full width of the original bore. Or a solid rod may be suspended from the closed end of the larger bore, as by a platinum wire, thus having an annular channel around the rod, through which the liquid column can flow; and such a rod may be tapered to equalize the calibration of the liquid column. In either event the inserted bar may be white or other color to more definitely show up the liquid column.

It will be understood that a longitudinal slot 32 is provided in the side of the valve stem to form a window through which the gauge tube may be seen, and this window preferably extends along that portion of the tube in which the cross area of its bore is reduced and restricted; and also that a properly calibrated scale is marked on the stem along the side of the window so as to properly designate the pressure to which the collapsible bulb is subjected.

The collapsible bulb is filled with mercury extending upward a short distance into the bore of the tube, within which the pressure of the contained air is normally equalized with the atmospheric pressure surrounding the bulb; and the tube is then inserted in the case formed by the valve stem, which is provided with an enlarged recess 33 for receiving the bulb, and this recess may be closed by a ring nut 34, through a central aperture 35, of which the bulb is exposed to the pressure which is present in the tire tube external to the collapsible bulb.

A bit of colored liquid, preferably alcohol with a pigment therein, may be inserted in the tube to float on the top of the mercury so as to more distinctly designate the upper end thereof as it rises in the bore of the tube; and it will be understood that the stem which carries the valve and the gauge can be enclosed in a transparent cap in well known manner, so that the window of the gauge is visible at all times.

We claim:

A pressure gauge including a stem, a transparent tube closed at one end and located in a longitudinal bore of the stem, a collapsible bulb secured to the other end of the tube, the bore of the tube being of substantially uniform diameter near the bulb and of a substantially uniform and materially reduced diameter near the closed end portion thereof, said bulb containing liquid extending upward a short distance into the bore of the tube to form a column in the tube when external pressure is applied to the bulb, the stem being provided with an enlarged recess for receiving the bulb, a ring nut forming a closure for the recess and being provided with a central aperture for exposing the bulb to pressure external to the bulb.

IRVING L. WOLCOTT.
WILLIS H. GRANT.